United States Patent [19]

Kohlhage

[11] 4,135,283
[45] Jan. 23, 1979

[54] RESILIENT STRUCTURAL MEMBER SUCH AS A PLATE SPRING

[75] Inventor: Ernst Kohlhage, Bühl, Fed. Rep. of Germany

[73] Assignee: Luk Lamellen u. Kupplungsbau GmbH, Bühl, Fed. Rep. of Germany

[21] Appl. No.: 776,788

[22] Filed: Mar. 11, 1977

Related U.S. Application Data

[63] Continuation of Ser. No. 624,286, Oct. 20, 1975, abandoned.

[30] Foreign Application Priority Data

Oct. 23, 1974 [DE] Fed. Rep. of Germany ....... 2450267

[51] Int. Cl.² .......................... F16F 1/32; C21D 7/06
[52] U.S. Cl. ......................................... 29/173; 72/53; 267/161

[58] Field of Search ...................... 72/53, 40; 29/173; 267/161, 162; 51/320, 319

[56] References Cited

U.S. PATENT DOCUMENTS

| Re. 26,714 | 11/1969 | Komarnitsky | 29/173 |
| 1,947,927 | 2/1934 | Vorwerk | 29/173 |
| 2,236,206 | 3/1941 | Becker | 29/173 |
| 2,608,752 | 9/1952 | Schilling | 29/173 |
| 2,983,503 | 5/1961 | Haussermann | 267/161 |

Primary Examiner—C. W. Lanham
Assistant Examiner—Gene P. Crosby
Attorney, Agent, or Firm—Herbert L. Lerner

[57] ABSTRACT

A resilient structural member is hardened and tempered, and partially shot peened, forming a roughened surface. The surface is smoothened to an at least partial extent by grinding and polishing in a drum, or by an electrochemical process.

9 Claims, 3 Drawing Figures

RESILIENT STRUCTURAL MEMBER SUCH AS A PLATE SPRING

The invention relates to a resilient structural member or component, such as a plate or dish spring, especially. More particularly, the invention relates to such a resilient member which, after being hardened or tempered, has a surface that has been subjected to a process of impingement by a stream of particles, such as shot-peening or the like.

It has been known heretofore, after stamping or punching and after hardening resilient structural members, such as plate springs, for example, to subject them to impingement by a stream of particles, such as a shot-peening process, for example, so as to effect a material or strain-hardening at the surface thereof whereby the durability thereof or the number of possible load changes or cycles therein is increased. In this regard, it is noted that an optimal durability, according to common or general practice, is attained if plate springs are subject to impingement by a stream of particles with an Almen Gauge intensity of A 0.2 to A 0.22 mm and the extent of coverage thereof is as greas as possible.

It has been found, however, that in spite of the increase in the extent of coverage of such structural members or components in a process of impingement by a stream of particles, a durability or load changing count or frequency could not be attained for many uses or applications thereof.

Accordingly, it is an object of the invention to provide a resilient structural member, such as a plate spring, especially, which exhibits a greater durability, namely a higher possible load change count, than for heretofore known resilient structural members of this general type, as well as a method of producing such structural members.

With the foregoing and other objects in view, there is provided, in accordance with the invention, a resilient structural member having a smooth surface formed on a prior roughened surface that had been produced by a process of impingement by a stream of particles after tempering or hardening of the structural member.

In accordance with the method of producing the resilient structural member, according to the invention, after subjecting the surface of the hardened or tempered resilient structural member to impingement by a stream of particles, the surface is smoothened by removal of material therefrom, at least the extremely projecting hills or peaks of material formed in the surface by the process of impingement by a stream of particles being removed. To effect this removal of projecting material in the surface of the resilient structural member, either an electrochemical process or a mechanical operation such as a polishing or grinding operation, as is known under the names of "Trowalization", "Roto-Finishing", or the like, is employed further in accordance with the invention. Such types of treatments or operations have proven to be especially advantageous because not only are the extremely projecting material peaks or hills resulting from the process of impingement removed but also the punched-out edges formed by stamping or punching, for example the outer edge of the plate spring or the recesses within the main body portion of the plate spring (as is generally known, the material in the middle of the thickness flows outwardly during the punching or stamping process and forms an irregular contour) are removed or smoothened.

In accordance with an especially advantageous mode of the method of the invention for producing the resilient structural member, such as a plate spring, impingement thereof by a stream of particles, such as shot-peening or the like is effected with a greater intensity than heretofore employed in producing resilient structural members of this general type, namely with an intensity having an Almen Gauge value in the order of magnitude of about A 0.3 mm, and with a smaller extent of coverage than heretofore required in producing such resilient structural members, namely a coverage in the vicinity of substantially 70% of the surface, and subsequently thereto, the aforementioned polishing or grinding treatment is performed.

The reason for the increase in the durability of a resilient structural member according to the invention or of a resilient structural member produced in accordance with the method of the invention, such as a plate spring, to twice or more times the durability of the heretofore known members of this general type, or of members produced by the heretofore known methods of this general type, is believed to be that due to the smoothening and heating in a drum or cylinder and the treatment resulting from the shot-peening (if desired, with higher intensity and smaller coverage than heretofore conventional) removes not only the extremely projecting peaks or hills of material formed thereby but also those contours of the structural member, such as the outer contours, for example, are treated, which are not subjected to the impingement by a stream of particles with adequate intensity due to the fact that the shot-peening treatment is effected substantially perpendicularly to the surface of the structural member. Moreover, due to the polishing or grinding process, a mechanical strain hardening is produced as a result the hammering of the surface or the contours by the polishing or grinding stones and also leveling the extremely outstanding or projecting peaks of material formed in the process of impingement by a stream of particles.

Other features which are considered as characteristic for the invention are set forth in the appended claims.

Although the invention is illustrated and described herein as embodied in resilient structural member such as a plate spring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
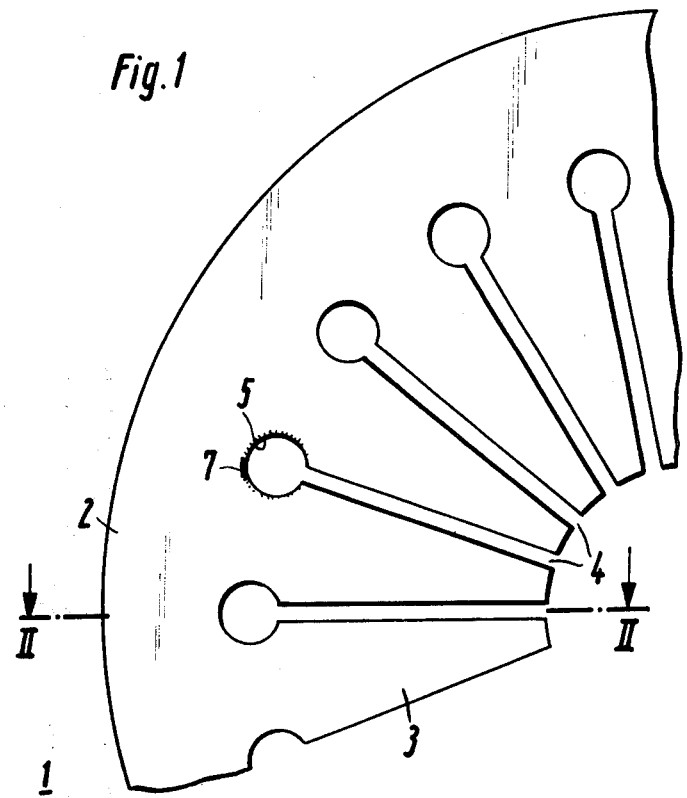
FIG. 1 is a partial top plan view of a plate spring constructed in accordance with the invention.
Figure 2:
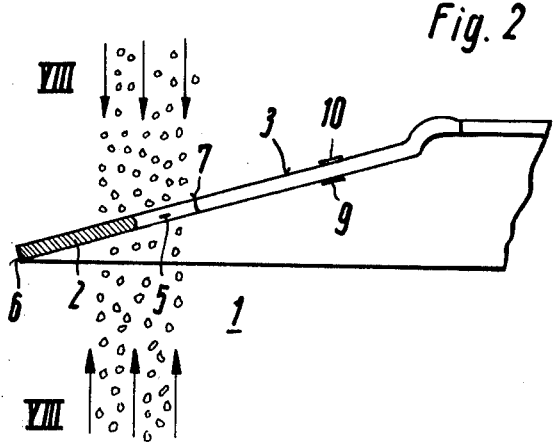
FIG. 2 is a cross-sectional view of FIG. 1 taken along the line II—II in the direction of the arrows.
Figure 3:
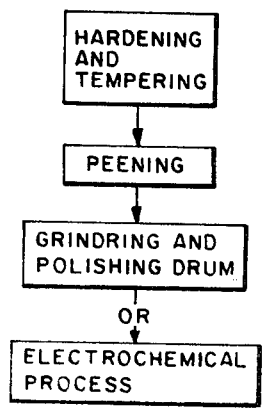
FIG. 3 is a flow diagram illustrating the process of making a plate spring.

Referring now to the figures of the drawing, there is shown therein a plate or dish spring 1 formed of a main body portion 2 and radially inwardly directed tongues 3 that are separated by slits 4 from one another, the slits 4 each terminating in respective circular recesses 5 at the main body portion 2. After the aforementioned stamping or punching operation and after the consequent formation of the punched edges 6 and 7 at the outer periphery of the main body portion 2 and at the recesses 5, respectively, the plate spring 1 is brought into the installation form thereof as seen in FIG. 2 in a conventional manner and is hardened and tempered. After hardening or tempering, the surface of the plate spring 1 is subjected to impingement by a stream of particles, such as shot-peening, generally in direction of the arrows VIII, substantially perpendicularly to the surface sides 9 and 10 i.e. substantially in direction of the rotary axis of the illustrated plate spring, whereby the surface sides 9 and 10 are strain-hardened. The surface parts 9 and 10 encountered by the impinging shot are given a roughness which, in the ensuing operation, a polishing or grinding treatment, such as "Trowalization" or "Roto-Finishing" or the like, are smoothened. Chamfers and nicks possibly produced during stamping or punching or the bulges or beads produced when punching out the punched edges 6 or 7 can be removed simultaneously by the polishing or grinding treatment and also at these as well as other locations that are not subjected to the impinging shot or are subjected to the impingement thereby with only inadequate intensity, strain-hardening is also produced due to the polishing or grinding treatment.

Due to polishing or grinding and consequent smoothening of the surface, notch effect is reduced. Due to the surface hardening, the surface is compressed and densified and can therefore, withstand very high stresses. An increase in durability of the part is thus provided in a two-fold manner.

I claim:

1. Method of producing a resilient structural member such as a plate spring which comprises tempering the member, then directing a stream of particles to impinge on a surface portion of the member so as to harden and roughen the surface portion of the member, and thereafter smoothening to at least a partial extent the material of the roughened surface formed by the impingement of the stream of particles.

2. Resilient structural member such as a plate spring produced by the method of claim 1.

3. Method according to claim 1 wherein the surface hardening process is shot-peening.

4. Method according to claim 3 wherein the intensity of the shot-peening has an Almen Gauge value of substantially A.0.3 mm, and coverage of substantially 70% of the surface by the shot-peening is effected.

5. Method of producing a resilient member such as a plate-spring which comprises tempering the member, then directing a stream of particles to impinge on a surface portion of the member so as to harden and roughen the surface portion of the member, and thereafter smoothening to at least a partial extent the roughened surface formed by the impingement of the stream of particles, the at least partial smoothening of the roughened surface being effected by removal of material.

6. Method according to claim 5 wherein the material removal is effected by a mechanical process.

7. Method according to claim 5 wherein the material removal is effected by an electrochemical process.

8. Method of producing the resilient structual member such as a plate-spring which comprises tempering the member, then directing a stream of particles to impinge on a surface portion of the member so as to harden and roughen the surface portion of the member, and thereafter smoothening to at least a partial extent the roughened surface formed by the impingement of the stream of particles, the at least partial smoothening of the roughened surface being effected by grinding.

9. Method of producing the resilient structural member such as a plate spring which comprises tempering the member, then directing a stream of particles to impinge on a surface portion of the member so as to harden and roughen the surface portion of the member, and thereafter smoothening to at least a partial extent the roughened surface formed by the impingement of the stream of particles, the at least partial smoothening of the roughened surface being effected by polishing.

* * * * *